United States Patent [19]

Loeber

[11] Patent Number: 5,159,175
[45] Date of Patent: Oct. 27, 1992

[54] METHOD OF WELDING A FIRST TO A SECOND METAL PLATE

[75] Inventor: Frederick W. Loeber, Tulsa, Okla.

[73] Assignee: Terex Corporation, Green Bay, Wis.

[21] Appl. No.: 592,267

[22] Filed: Oct. 3, 1990

[51] Int. Cl.⁵ .............................................. B23K 9/00
[52] U.S. Cl. ............................................... 219/137 R
[58] Field of Search ................................. 219/137 R

[56] References Cited

U.S. PATENT DOCUMENTS

| | | | |
|---|---|---|---|
| 3,253,121 | 5/1966 | Robbins | 219/137 |
| 3,324,278 | 6/1967 | Jackson | 219/137 |
| 3,503,117 | 3/1970 | Nikolsky | 29/470.1 |
| 3,634,650 | 1/1972 | Nomura | 219/137 |
| 3,704,358 | 11/1972 | Saito et al. | 219/73 |
| 3,748,429 | 7/1973 | Agusa et al. | 219/73 |
| 3,777,105 | 12/1973 | Fischer et al. | 219/73 |
| 3,832,523 | 8/1974 | Kitani et al. | 219/137 |
| 3,883,711 | 5/1975 | Fischer et al. | 219/73 |
| 4,041,270 | 8/1977 | Akahide et al. | 219/73 |
| 4,058,700 | 11/1977 | Ito et al. | 219/137 |
| 4,097,716 | 6/1978 | Reichelt et al. | 219/137 |
| 4,196,335 | 4/1980 | Ikeda et al. | 219/73 |

FOREIGN PATENT DOCUMENTS

| | | |
|---|---|---|
| 2274389 | 1/1976 | France . |
| 556208 | 11/1974 | Switzerland . |
| 1250152 | 10/1971 | United Kingdom . |
| 2210309 | 6/1989 | United Kingdom . |

OTHER PUBLICATIONS

Patent Abstract Of Japan vol. 9, No. 319 (M-439)(2042) Dec. 14, 1985 & JP, A,60152367 Aug. 10, 1985.

*Primary Examiner*—Clifford C. Shaw
*Attorney, Agent, or Firm*—Head & Johnson

[57] ABSTRACT

A method of welding a first metal plate to a second metal plate including the steps of affixing a back-up bar by use of spaced welding tacks to the flat surface of a first metal plate, forming an abutting edge on the second metal plate a series of alternating lands and slots, the slots extending through the entire thickness of the second metal plate and the length of the slots being substantially greater than the length of the lands, positioning the formed edge of the second metal plate so that the lands thereof engage the flat surface of the first metal plate and a substantially continuous slot is formed between the plates and in which the second metal plate is in engagement with the back-up bar to form a joint, arc welding with a consumable electrode in the substantially continuous slot to form a weld, the weld penetrating portions of the flat surface of the first metal plate, the entire abutting edge of the second metal plate and a portion of the back-up bar and melting the lands and the welding tacks and in which the welding step is preferably performed in one pass.

5 Claims, 1 Drawing Sheet

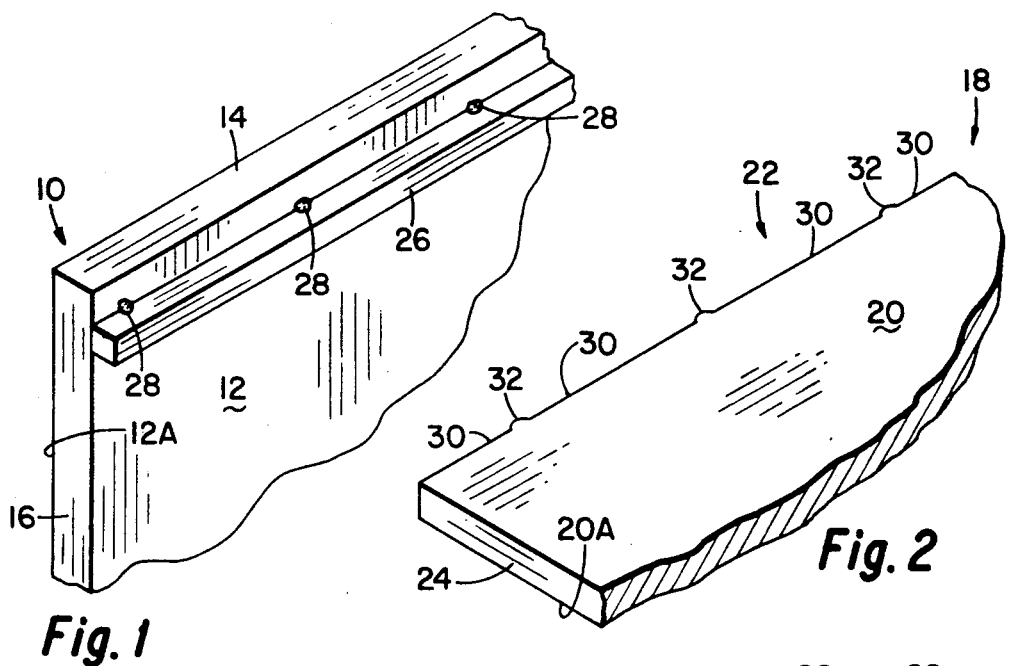
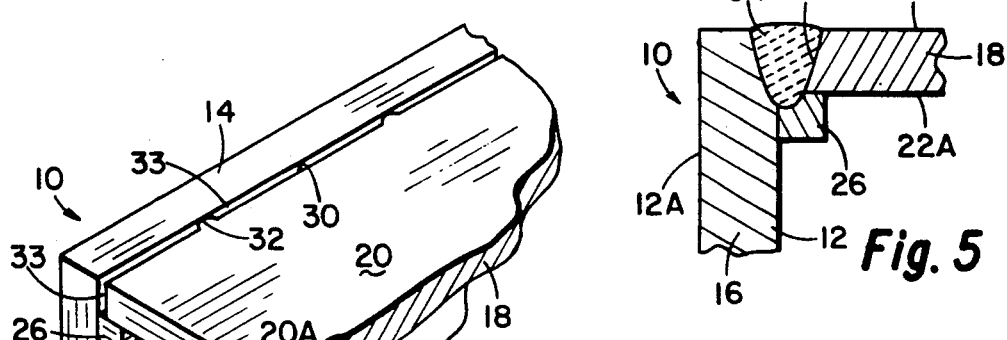
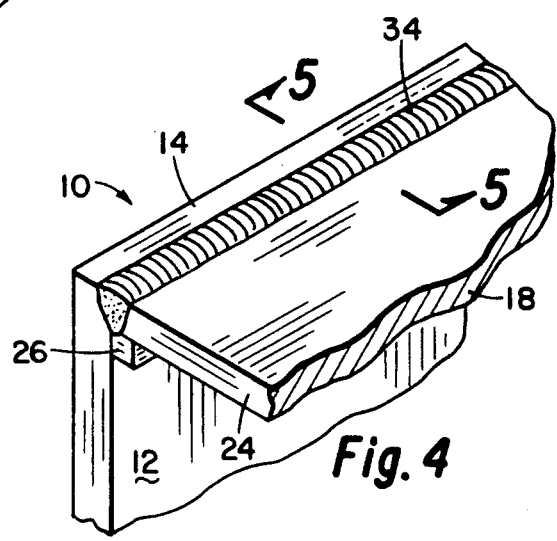

METHOD OF WELDING A FIRST TO A SECOND METAL PLATE

BACKGROUND AND SUMMARY OF THE INVENTION

In fabricating structural members, such as beams for buildings, for the frame structure of large trucks, and other applications, it is frequently necessary to weld the edge of one metal plate to the flat surface of another metal plate. The typical way of forming such a joint is to bevel the edge of one metal plate at about 45 degrees to form a V-shaped valley between the bevelled edge and the flat surface of the other plate. This valley is then filled by sequential passes of a welding arc electrode in which the electrode is consumed and metal is deposited with each pass until the valley is filled.

This standard technique is time consuming and expensive due to the fact that a plurality of passes of the welding arc electrode is required in order to fill the valley formed between the second plate and the first plate. Such welding joint is usually referred to as a "partial or full penetration weld."

An alternate method of welding the edge of a second metal plate to a first metal plate employs the step of forming a series of alternating lands and slots in the edge of the second metal plate. The slots extend the full thickness of the second metal plate. Welding is then accomplished by filling in the slot formed between the edge of the second metal plate and the surface of the first metal plate by a consumable arc welding electrode and in the process, the lands are melted and form an integral part of the completed weld. U.S. Pat. No. 4,097,716 entitled "Welding Method" describes this technique as applied to relatively thin material. This technique has advantages over the method generally employed in industry as above first described, that is, it is superior to forming V-shaped valley between the plates to be welded. However, the method of this patent has some limitations in that the weld must preferably be formed with the slot between the plates positioned in a horizontal plane which requires the welding electrode to be held at an angle relative to the horizontal. Otherwise, if the slot is in a vertical plane, molten metal formed by the weld may blow through the slot. This process can obtain a partial penetration weld with a fillet weld added.

The object of the present disclosure is to provide an improved method of welding a first metal plate to a second metal plate which overcomes the limitations and problems described with reference to the technique employing a V-shaped notch and is superior to the technique of using spaced lands and slots as described in U.S. Pat. No. 4,097,716. This process will yield a full penetration weld with or without fillet. The present invention is particularly useful for welding relatively thick material of, by example, $\frac{1}{4}"$ to 1" thick.

The method of this disclosure for welding a first metal plate to a second metal plate includes the step of first affixing a back-up bar to the surface of the first metal plate. The back-up bar is affixed by means of a series of spaced apart tack welds. The tacks are placed at the intersection of one edge of the back-up bar with the flat surface of the first metal plate and are of sufficient depth so as to temporarily support the back-up bar in position on the flat surface of the first metal plate.

The second step in the method is to form an abutting edge on the second metal plate. This abutting edge is formed by a series of alternating lands and slots. The slots extend through the entire thickness of the metal plate and the length of the slots are substantially greater than the length of the lands. Typically the length of the slots may be as high as 50 to 1 compared to the length of the lands.

The second metal plate is then positioned at substantially perpendicular to the surface of the first metal plate and in engagement with the back-up bar to form the joint to be welded. The lands of the second metal plate engage the flat surface of the first metal plate. One flat surface of the second metal plate rests upon or is in engagement with the back-up bar.

While the orientation of the plates during welding is variable, in the preferred method the first metal plate is positioned vertically and the second metal plate horizontally. This thereby provides a joint having a vertical slot (except for the short length lands) between one edge of the second metal plate and the flat surface of the first metal plate. The back-up bar closes the lower end of the slot thus formed between the second and the first metal plates.

The final step in the method is that of arc welding the joint with a consumable electrode. The weld performed in the slot penetrates portions of the flat surface of the first metal plate, the entire abutting edge of the second metal plate and a portion of the back-up bar. The welding is preferably formed in a single pass, the weld being achieved within the slot formed between the edge of the second metal plate and the flat surface of the first metal plate, and the weld serves to consume and melt the lands formed on the second metal plate as well as the tacks used to attach the back-up bar to the first metal plate. The tacks are consumed to eliminate a common source of fatigue failure site initiation. Also, a single pass weld is desired over the employing multiple passes to reduce end item distortion commonly caused by multiple pass welds.

For background information relating to methods of welding, see the following United States prior issued U.S. Pat. Nos. 3,634,650; 4,196,335; 3,253,121; 3,324,278; 3,503,117; 3,704,358; 3,777,104; 3,832,523; 3,883,711; 4,041,270; 4,058,700; 4,097,716 and 3,748,429.

A better understanding of the invention will be had by reference to the following description and claims, taken in conjunction with the attached drawings.

DESCRIPTION OF THE DRAWINGS

FIG. 1 is an isometric partial view of a first metal plate having a flat surface and showing a back-up bar tack welded to the plate flat surface.

FIG. 2 is an isometric partial view of a second metal plate having an edge which is to be welded to the flat surface of the first metal plate and showing the edge formed with a series of lands and slots and with the slots being substantially greater in length than the length of the lands.

FIG. 3 is a partial view of the first metal plate and second metal plate with a back-up bar in position forming a joint ready to be welded.

FIG. 4 shows the view as in FIG. 3 but showing an arc weld joining the second to the first plate.

FIG. 5 is a cross-sectional view taken along the line 5—5 of FIG. 4 and showing the boundaries of the weld.

DESCRIPTION OF THE PREFERRED EMBODIMENT

Referring to the drawings and first to FIGS. 1 and 2, two plates are illustrated which are to be joined together. FIG. 1 shows a fragmentary corner portion of a first flat metal plate, generally indicated by the numeral 10. The first plate 10 has a planar flat surface 12 and an opposed flat surface 12A. The plate has a horizontal edge 14 and a vertical edge 16.

The second metal plate, generally indicated by the numeral 18, has a flat surface 20 and an opposed flat surface 20A. The second plate has a first edge, generally indicated by the numeral 22, which has been specifically formed in a manner which will be described subsequently, and a side edge 24.

The object of this disclosure is to provide an improved means of welding edge 22 of plate 18 to the flat surface 12 of plate 10 in a generally perpendicular configuration.

The first step is to tack weld a back-up bar 26 to the flat surface 12 of plate 10. The spaced welding tacks are indicated by the numeral 28.

In the method of practicing the invention shown herein, the objective is to weld plate 18 to the surface 12 of plate 10 in a right-angle joint position in which the surface 20 of plate 18 is substantially in the same plane as the first plate horizontal edge 14. To accomplish this objective the back-up bar 26 is spaced parallel to and below the edge 14 a distance equal to the thickness of plate 18. It is to be understood that the invention is not limited to the formation of a right-angle joint, but instead the invention can equally as well be practiced to form a T-joint, that is, in which the back-up bar 26 is spaced away from the first plate edge 14 a distance which is greater than the thickness of second plate 18.

The second basic step in the method of this disclosure is to configure the first edge 22 of second plate 18. This is achieved by cutting slots 30 in the edge 22 with intermittent lands 32. Stating this another way, the slots are cut leaving the lands 32 as they exist prior to the cutting operation formed on edge 22. The lengths of the slots 30 are substantially greater than the relative lengths of the lands 32 and may be such as a ratio of fifty to one. The functions of lands 32 is to provide spacing for the formation of a welding slot and therefore the lands can be, as illustrated, very short in length and may be rounded as indicated or flat.

Instead of cutting slots 30 in the edge 22 of plate 18 short length metal tabs (not shown) can be tack welded to edge 22 to secure the same function as lands 32.

The next step in the method is to assemble second plate 18 in contact with the first plate 10 to form a joint, as illustrated in FIG. 3. The plates are assembled so that the lands 32 contact the first plate flat surface 12 to form a substantially continuous welding slot 33 (interrupted only by the short lands 32) between the edge 22 of plate 18 and the flat surface 12 of plate 10. The back-up bar 26 forms a bottom for slot 33 formed between the plates.

The welding process is carried out utilizing an expendable electrode, the weld being formed in slot 33. The weld can be accomplished with a single pass, the completed weld being illustrated in FIG. 4. Back-up bar 26 serves to prevent molten metal from flowing past the joint formed. FIG. 5 shows in cross-section the weld formed by the method. Note that the weld 34 penetrates a portion of the first plate flat surface 12, a portion of the back-up bar 26 and the weld encompasses the full edge 22 of plate 18. Thus, the weld joins the three elements together. The weld 34 encompasses lands 32 as well as tacks 28 so that they are melted and disappear in the weld when completed.

Back-up bar 26 keeps molten weld metal from flowing through as the weld 34 is made and the back-up bar forms a part of the completed joint. It is important that the tacks 28 be positioned so as not to coincide with lands 32 so lands 32 can fully contact plate surface 12 and can be in the same plane as the first plate edge 14.

The weld accomplished leaves no exposed tack sites which are notorious for forming points of fatigue crack initiation. This is achieved since the tacks are consumed in the weld. The method eliminates the labor intensive bevelling as is employed with the usual welding process and eliminates the need of repeated weld passes to fill the typical V-shaped weld joint. Single pass welding of this type tends to reduce over-all weldment distortion compared to smaller, multiple pass bevel welds.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of steps without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of welding one metal plate to another metal plate at substantially a right angle comprising the steps of:

affixing a back-up bar to a flat surface of a first metal plate;

forming on an edge of a second metal plate a series of lands leaving therebetween slots extending through the entire thickness of the second metal plate, the length of the slots being substantially greater than the length of the lands;

positioning said second metal plate to form a joint with said first metal plate so that said lands engage said flat surface of said first metal plate to thereby provide a substantially continuous welding slot between said edge of said second metal plate and said surface of said first metal plate, and in which said second metal plate is in engagement with said back-up bar, the width of said back-up bar being at least equal to the width of said welding slot, the welding slot being bound on one side by said flat surface of said first metal plate, on the opposite side by said edge of said second metal plate, on one end by said back-up bar and the welding slot other end being open;

arc welding, with a consumable electrode, to form a weld in said welding slot which weld penetrates a portion of said flat surface of said first metal plate, the entire said edge of said second metal plate and a portion of said back-up bar, and wherein said lands are melted.

2. The method of welding one metal plate to another metal plate according to claim 1 wherein said step of forming on said edge of said second metal plate a series of lands includes cutting a series of slots in the edge leaving alternating lands therebetween, the slots being the full thickness of said second metal plate.

3. The method of welding one metal plate to another metal plate according to claim 1 wherein the ratio of the lengths of said slots to the lengths of said lands is about 50 to 1.

4. The method of welding one metal plate to another metal plate according to claim 1 wherein said back-up bar is positioned paralleled to and spaced from an edge of said first metal plate a distance equal to substantially the thickness of said second metal plate to thereby form a right-angle joint.

5. A method of welding one metal plate to another metal plate according to claim 1 wherein said step of affixing said back-up bar to said flat surface of said first metal plate includes the use of spaced welding tacks and in which the step of arc welding includes melting said tacks.

* * * * *